(12) United States Patent
Fujise et al.

(10) Patent No.: US 7,594,056 B2
(45) Date of Patent: Sep. 22, 2009

(54) BRIDGE AND DATA PROCESSING METHOD THEREFOR

(75) Inventors: Shunichi Fujise, Abiko (JP); Akitomo Fukui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 11/509,775

(22) Filed: Aug. 25, 2006

(65) Prior Publication Data
US 2007/0067543 A1    Mar. 22, 2007

(30) Foreign Application Priority Data
Aug. 26, 2005    (JP) .............................. 2005-246429

(51) Int. Cl.
*G06F 13/36* (2006.01)
(52) U.S. Cl. .................... 710/306; 710/305; 710/22
(58) Field of Classification Search ............... 710/308, 710/305–306, 100, 22, 5
See application file for complete search history.

(56) References Cited

U.S. PATENT DOCUMENTS

| | | | | |
|---|---|---|---|---|
| 6,253,250 B1 * | 6/2001 | Evans et al. ................. 709/253 |
| 6,317,799 B1 * | 11/2001 | Futral et al. .................... 710/22 |
| 6,807,590 B1 * | 10/2004 | Carlson et al. ................ 710/57 |
| 6,968,207 B1 | 11/2005 | Ezumi et al. |
| 2005/0060441 A1 * | 3/2005 | Schmisseur ................... 710/22 |
| 2005/0235068 A1 * | 10/2005 | Moriki et al. .................. 710/5 |

FOREIGN PATENT DOCUMENTS

JP          9-319698          12/1997

\* cited by examiner

*Primary Examiner*—Mark Rinehart
*Assistant Examiner*—Kim T Huynh
(74) *Attorney, Agent, or Firm*—Fitzpatrick, Cella, Harper & Scinto

(57) ABSTRACT

There is provided a bridge which connects between a primary bus and secondary bus. The bridge reads out a descriptor from a primary memory of the primary bus, reads out a status from a secondary memory of the secondary bus, writes, into the primary memory of the primary bus, the readout status in accordance with the descriptor, and writes, into the primary memory of the primary bus, a flag indicating completion of the write of the readout status.

3 Claims, 6 Drawing Sheets

BRIDGE AND DATA PROCESSING METHOD THEREFOR

BACKGROUND OF THE INVENTION

1. Field of the Invention

The present invention relates to a bridge and a data processing method therefor.

2. Description of the Related Art

In an information processing apparatus such as a communication apparatus and an OA equipment, a bus for transferring data at high speed is needed in order to increase the processing speed. As an example of the bus, there is a PCI (Peripheral Component Interconnect) bus. The PCI bus is defined in, e.g., PCI Local Bus Specification and PCI-to-PCI Bridge Architecture Specification. For example, a 33-MHz, 132-MB/s PCI bus with a 32-bit width is used to connect parts within a PC.

Data transactions between a producer 101 and consumer 104 in PCI Local Bus Specification Revision 2.3 will be described using FIG. 1.

Referring to FIG. 1, the producer 101, a flag 102 and a status 103 are connected to PCI bus 1. The consumer 104 and a data unit 105 are connected to PCI bus 0. PCI bus 0 and PCI bus 1 are connected by a PCI-PCI bridge 106.

<Data Transfer from Producer 101 to Consumer 104>

•Operation of Producer 101

P1) When data is generated (or created), the producer 101 writes the data in the data unit 105.

P2) The producer 101 sets the flag 102 indicating completion of the write of the data. Note that this flag 102 will be reset in C2) to be described later.

P3) The producer 101 waits for the status 103 which is written by the consumer 104 upon completion of data processing. In this case, the status 103 is "complete read".

P4) When the "complete read" status is detected, the producer 101 clears the status 103 (sets the status 103 to "incomplete write") and starts a next data generation. When the data generation is complete, the operation returns to P1) and repeats P1) to P4).

•Operation of Consumer 104

C1) The consumer 104 finds a "set" status of the flag 102 indicating completion of data generation (or creation) of the producer 101.

C2) The consumer 104 resets the flag 102 and processes the data.

C3) When the data processing is complete, the consumer 104 writes the status 103 indicating completion of the data processing. When the write of the status is complete, the operation returns to C1) and repeats C1) to C3).

<Data Transfer from Consumer 104 to Producer 101>

•Operation of Producer 101

P1) The producer 101 prepares a data storage area in the data unit 105.

P2) The producer 101 sets the flag 102 indicating completion of the data storage area preparation. Note that this flag 102 will be reset in C2) to be described later.

P3) The producer 101 waits for the status 103 which is written by the consumer 104 upon completion of data processing. In this case, the status 103 is "complete write".

P4) When the "complete write" status is detected, the producer 101 clears the status 103 (sets the status 103 to "incomplete read") and starts a next data storage area preparation. When the data storage area preparation is complete, the operation returns to P1) and repeats P1) to P4).

•Operation of Consumer 104

C1) The consumer 104 finds a "set" status of the flag 102 indicating completion of data area preparation of the producer 101.

C2) The consumer 104 resets the flag 102 and processes the data.

C3) When the data processing is complete, the consumer 104 writes the status 103 indicating completion of the data processing. When the write of the status is complete, the operation returns to C1) and repeats C1) to C3).

FIG. 2 shows an embodiment of the configuration in FIG. 1. In this embodiment, the producer 101 shown in FIG. 1 consists of a primary bus 201, CPU 202 and memory 203. The consumer 104 consists of a secondary bus 204, CPU 205 and memory 207. A DMA accelerator 206 is provided on the secondary bus 204 to perform status transfer by DMA transfer.

The status transfer operation of the system shown in FIG. 2 is as follows. Note that a descriptor indicates a status write address in the primary bus 201, and is embedded with a status write address, a next descriptor address and flag information representing whether or not the next descriptor is valid. Assume that the suitable number of descriptors are prepared in a chain.

(1) A bridge 208 reads a descriptor from the memory 203 on the primary bus 201.

(2) The DMA accelerator 206 reads the descriptor from the bridge 208.

(3) The DMA accelerator 206 also reads a status from the memory 207 on the secondary bus 204.

(4) The DMA accelerator 206 writes the status into the bridge 208.

(5) The bridge 208 writes the status into the memory 203 on the primary bus 201.

(6) The DMA accelerator 206 writes a new descriptor into the bridge 208.

(7) The bridge 208 writes, into the memory 203, a flag indicating completion of the status transfer to the descriptor.

On the other hand, the techniques for increasing the efficiency of data transfer by a PCI bus and for reducing a processing load on a CPU related to the data transfer by a PCI bus have been proposed (e.g., see Japanese Patent Application Laid-Open No. 9-319698).

However, in the method as the prior art described above in which a DMA accelerator is provided on a secondary bus, and in Japanese Patent Application Laid-Open No. 9-319698, all transactions including status transfer have to be done through a PCI bridge, thereby decreasing the performance.

A DMA accelerator and DMA controller need to operate using a secondary bus, because they are on the secondary bus. Moreover, software management for a PCI bridge and transaction order of DMA is complex.

Also, in the prior art, hardware performance of a secondary bus is low, and a software operation is restricted.

In the prior art, if there is a plurality of functions in a PCI bus, it is impossible to operate them simultaneously. Furthermore, cumbersome processing is needed. For example, a function is executed by making initial settings when a functional operation is started, and negotiation is redone when the operation is switched.

The technique in Japanese Patent Application Laid-Open No. 9-319698 is not suitable for a case in which the amount of data to be transferred is small, e.g., for a case in which a status is transferred.

SUMMARY OF THE INVENTION

It is an object of the present invention to improve the performance of a secondary bus connected to a primary bus via a bridge.

It is an object of the present invention to provide a bridge which connects between a primary bus and secondary bus, comprising descriptor reading means for reading out a descriptor from a primary memory of the primary bus, status reading means for reading out a status from a secondary memory of the secondary bus, status writing means for writing, into the primary memory of the primary bus, the status read out by the status reading means, in accordance with the descriptor, and flag writing means for writing, into the primary memory of the primary bus, a flag indicating completion of the write of the status read out by the status reading means.

It is an object of the present invention to provide a bridge which connects between a primary bus and secondary bus, comprising a DMA accelerator, the DMA accelerator comprising descriptor reading means for reading out a descriptor from a primary memory of the primary bus, status reading means for reading out a status from a secondary memory of the secondary bus, status writing means for writing, into the primary memory of the primary bus, the status read out by the status reading means, in accordance with the descriptor, and flag writing means for writing, into the primary memory of the primary bus, a flag indicating completion of the write of the status read out by the status reading means.

It is an object of the present invention to provide a bridge which connects between a primary bus and secondary bus, comprising bridge means, DMA accelerator means, and setting means for setting information common to the bridge means and the DMA accelerator means.

It is also an object of the present invention to provide a bridge which connects between a primary bus and secondary bus, comprising bridge means, DMA accelerator means, and arbiter means for controlling output from the bridge means and the DMA accelerator means to the primary bus.

Further features of the present invention will become apparent from the following description of exemplary embodiments (with reference to the attached drawings).

DESCRIPTION OF THE EMBODIMENT

The best mode for carrying out the present invention will be described in detail below with reference to the accompanying drawings.

The configuration of a PCI bridge in the embodiment which performs status transfer on a PCI bus and update of a descriptor will be described first using FIG. 3.

Figure 3:
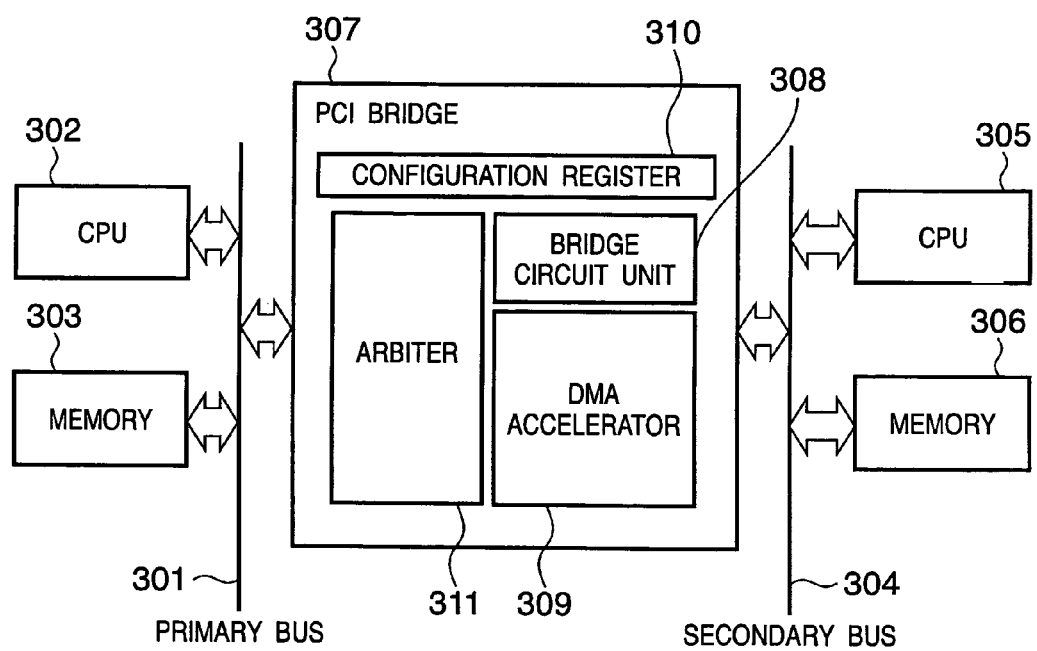
FIG. 3 is a block diagram showing an example of the configuration of a PCI bridge 307 in the embodiment.

FIG. 3 is a block diagram showing an example of the configuration of a PCI bridge 307 in the embodiment. As shown in FIG. 3, a CPU 302 and memory 303 are connected to a primary bus 301. The CPU 302 controls the memory 303 and other components (including ones which are not shown in FIG. 3) connected to the primary bus 301. The memory 303 accumulates parameters necessary for the control operation of the CPU 302. In this case, the memory 303 accumulates data, a flag, a status, a descriptor and the like with respect to, e.g., a PCI bus.

Note that in the example shown in FIG. 3, there is provided one memory 303, but a plurality of memories may be connected. Other components which are connected to the primary bus 301 are omitted.

On the other hand, a CPU 305 and memory 306 are connected to a secondary bus 304. The CPU 305 controls the memory 306 and other components (including ones which are not shown in FIG. 3) connected to the secondary bus 304. The memory 306 accumulates parameters necessary for the control operation of the CPU 305. In this case, the memory 306 accumulates data, a status, and the like with respect to, e.g., a PCI bus.

Note that in the example shown in FIG. 3, there is provided one memory 306, but a plurality of memories may be connected. Other components which are connected to the secondary bus 304 are omitted.

The PCI bridge 307 between the primary bus 301 and secondary bus 304 performs a transaction between the primary bus 301 and secondary bus 304. The PCI bridge 307 includes a bridge circuit unit 308, DMA accelerator 309, configuration register 310 and arbiter 311.

Figure 1:
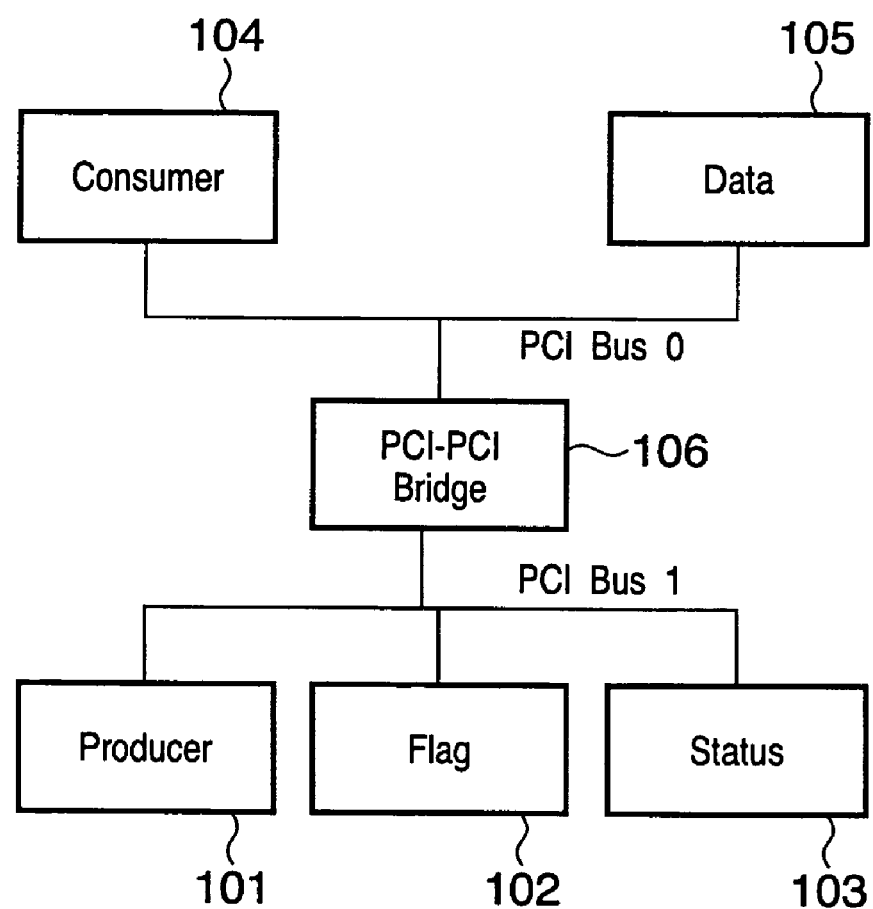
FIG. 1 is a block diagram for explaining a data transaction between a producer and consumer.
Figure 2:
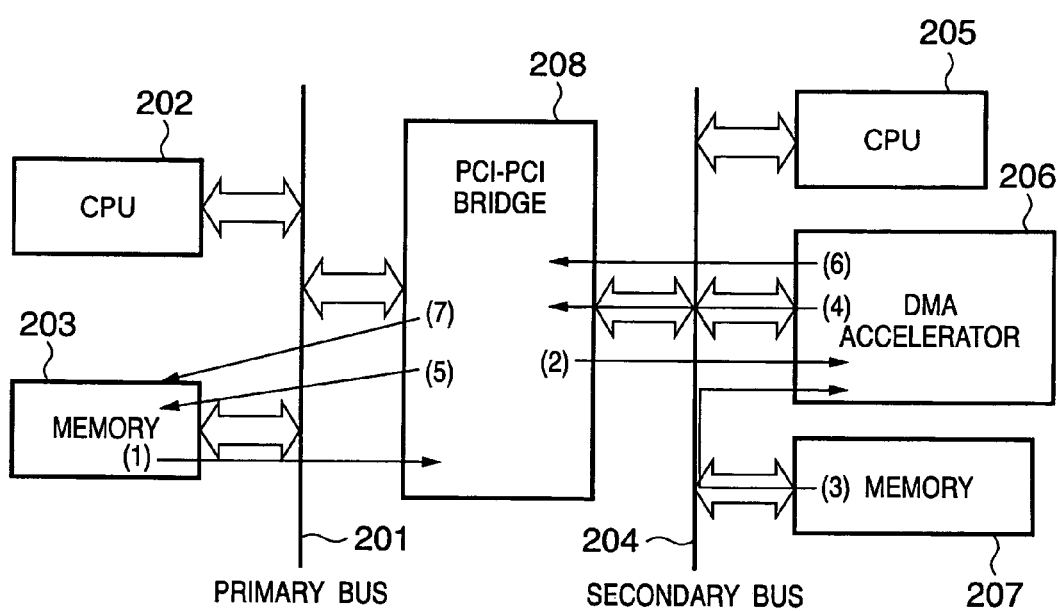
FIG. 2 is a block diagram for explaining an embodiment of the configuration in FIG. 1.

In the PCI bridge 307, the bridge circuit unit 308 corresponds to the PCI-PCI bridge 106 shown in FIG. 1, and a data transaction is processed as explained with reference to FIG. 1. The DMA accelerator 309 performs status transfer and update of a descriptor. The configuration register 310 is a common register for various settings for operating the bridge circuit unit 308 and DMA accelerator 309 as one device on the PCI bus.

That is, the configuration register 310 is configured to be able to make the various settings by writing settings of the bridge circuit unit 308 and DMA accelerator 309 into the configuration register 310 from the primary bus 301.

Figure 4:
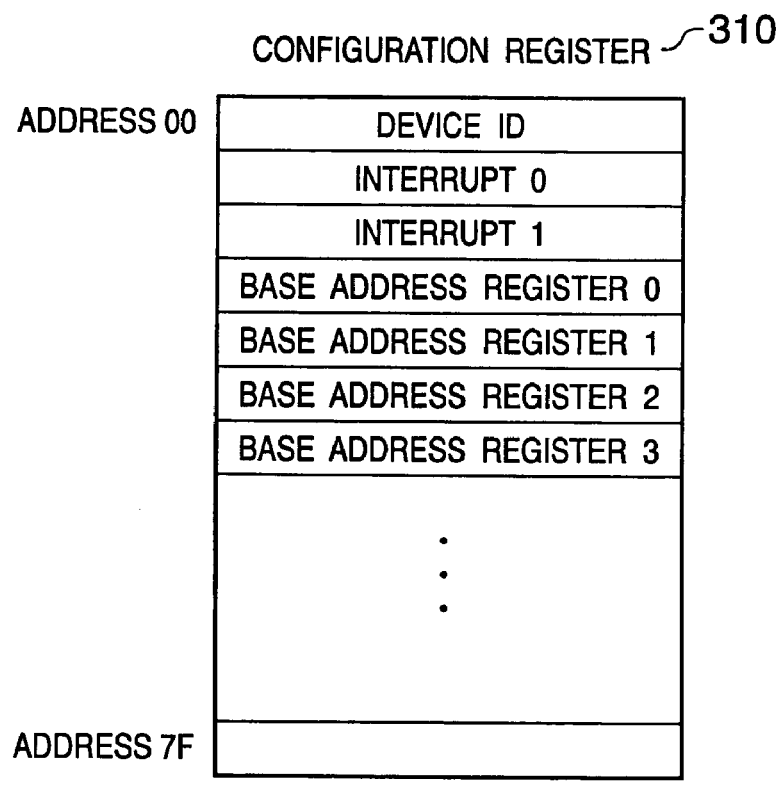
FIG. 4 is a view showing an example of the configuration of a configuration register 310.

FIG. 4 is a view showing an example of the configuration of the configuration register 310. As shown in FIG. 4, the configuration register 310 consists of registers from address 00 to address 7F. A common device ID, interrupts, base address registers and the like can be set into the configuration register 310. The settings of the registers are common to the bridge circuit unit 308 and DMA accelerator 309, and affect them equally.

The arbiter 311 of the PCI bridge 307 discriminates between transactions of the bridge circuit unit 308 and those of the DMA accelerator 309.

Figure 5:
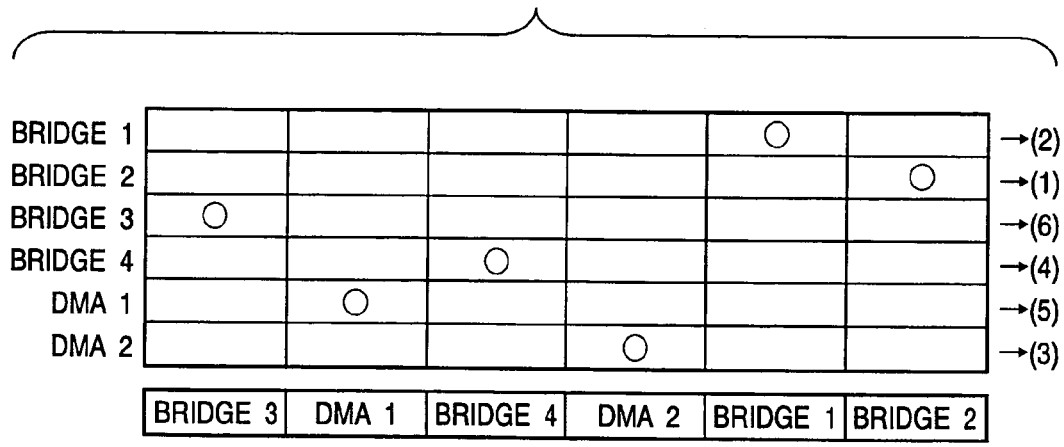
FIG. 5 is a view showing a queue image in an arbiter 311.

FIG. 5 is a view showing a queue image in the arbiter 311. As shown in FIG. 5, queues (four transactions of bridge 1, bridge 2, bridge 3 and bridge 4) for the bridge circuit unit 308 and those (two transactions of DMA 1 and DMA 2) for the DMA accelerator 309 are prepared in the arbiter 311.

Upon occurrence of transactions in the bridge circuit unit 308 and DMA accelerator 309, the arbiter 311 is required of entries. When the entries are allowed, the transactions are queued. If it is allowed to output a transaction from the arbiter 311, an enable signal is issued and the transaction is output to the primary bus 301. The queuing and outputting transactions are timed (clocked) and output in the order queued. In the example shown in FIG. 5, the transactions are queued and output in the order of bridge 2, bridge 1, DMA 2, bridge 4, DMA 1 and bridge 3.

With this configuration, the configurations of the bridge circuit unit 308 and DMA accelerator 309 can be simplified. Also, the DMA accelerator 309 can bypass the bridge circuit unit 308, and directly operate on the PCI bus.

Furthermore, it is possible to operate the bridge circuit unit 308 and DMA accelerator 309 simultaneously.

An operation of the PCI bridge 307 which performs status transfer on the PCI bus and update of a descriptor will now be described using FIG. 6.

Figure 6:
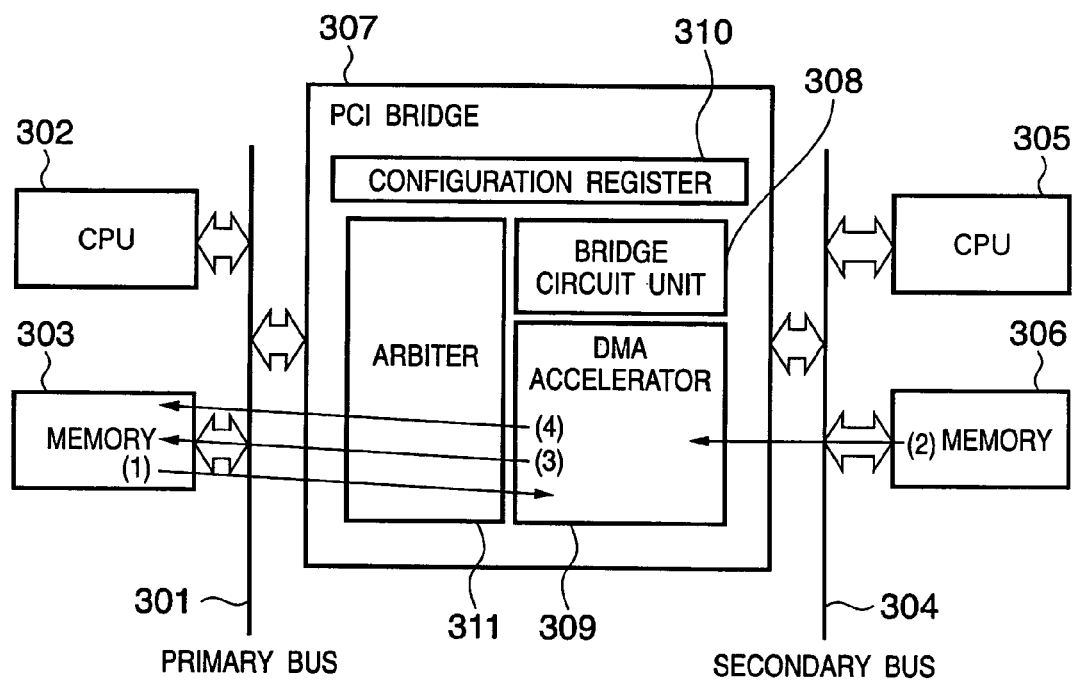
FIG. 6 is a block diagram for explaining an example of status transfer of the PCI bridge 307 in the embodiment.

FIG. 6 is a block diagram for explaining an example of status transfer of the PCI bridge 307 in the embodiment. In the example shown in FIG. 6, an exemplary flow of status transfer of the secondary bus 304 to the primary bus 301 is illustrated.

For data transfer, a descriptor is prepared on the primary bus 301 side. According to the descriptor information, the DMA accelerator 309 transmits a status indicating completion of data transfer of the secondary bus 304.

(1) The DMA accelerator 309 reads the descriptor in the memory 303 of the primary bus 301.

(2) The DMA accelerator 309 reads the status ("data transfer end") prepared in the memory 306 of the secondary bus 304.

(3) The DMA accelerator 309 writes the status into the memory 303 (into a write address indicated by the above-described descriptor) of the primary bus 301.

That is, on the primary bus 301 side, it is confirmed that the descriptor is updated, thereby determining the arrival of the status indicating completion of the data transfer.

(4) The DMA accelerator 309 writes, into the memory 303, flag indicating completion of the status transfer to the above-described descriptor.

That is, when the status transmission is complete, the DMA accelerator 309 updates the descriptor indicating completion of the status transmission, and determines whether or not a next descriptor is valid in accordance with the information of the current descriptor. If the next descriptor is valid, the flow returns to the above (1) to read the next descriptor, and repeats the above (1) to (4).

With this configuration, the number of transactions of the secondary bus decreases, the performance of the secondary bus improves, and constraint on the software operation is reduced. That is, the performance of the PCI bridge improves.

Software management for the PCI bridge and a transaction order of the DMA accelerator is also simplified.

According to the embodiment, the configurations of the PCI bridge and DMA accelerator are simplified as described above.

A plurality of functions of the PCI bridge and DMA accelerator of the PCI bus can be operated simultaneously without cumbersome processing.

The present invention may be applied to a system including a plurality of devices (e.g., a host computer, interface device, reader, and printer) or an apparatus (e.g., a copying machine or facsimile apparatus) formed by a single device.

When a recording medium which records software program codes for implementing the functions of the above-described embodiment is supplied to a system or apparatus, the computer (or the CPU or MPU) of the system or apparatus reads out and executes the program codes stored in the recording medium. With this operation, the object of the present invention is also achieved.

In this case, the program codes read out from the recording medium implement the functions of the above-described embodiment, and the recording medium which stores the program codes constitutes the present invention.

The recording medium for supplying the program codes includes a hard disk, optical disk, magnetooptical disk, CD-ROM, CD-R, magnetic tape, nonvolatile memory card, and ROM.

The functions of the above-described embodiment are implemented when the computer executes the readout program codes and in the following case. That is, when an OS (Operating System) or the like running on the computer performs some or all of actual processes on the basis of the instructions of the program codes, the functions of the above-described embodiment are implemented.

Furthermore, the present invention includes a case in which, after the program codes read out from the recording medium are written in the memory of a function expansion board inserted into the computer or the memory of a function expansion unit connected to the computer, the CPU of the function expansion board or function expansion unit performs some or all of actual processes on the basis of the instructions of the program codes and thereby implements the functions of the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-246429 filed on Aug. 26, 2005, which is hereby incorporated by reference herein in its entirety.

What is claimed is:

1. A PCI bridge which connects between a primary bus and a secondary bus, comprising:
   a PCI-to-PCI bridge unit for transferring a transaction between the primary bus and the secondary bus;
   a DMA accelerator;
   an arbiter including a first queue for said PCI-to-PCI bridge unit and a second queue for said DMA accelerator to control output from said PCI-to-PCI bridge unit and said DMA accelerator to the primary bus; and
   a configuration register for storing information including a device identifier, which is common to said PCI-to-PCI bridge unit and said DMA accelerator, to cause said PCI-to-PCI bridge unit and said DMA accelerator to operate as one device on a bus,
   wherein said DMA accelerator comprises:
   descriptor reading means for reading out a descriptor from a primary memory of the primary bus;
   status reading means for reading out a status from a secondary memory of the secondary bus;
   status writing means for writing, into the primary memory of the primary bus, the status read out by said status reading means, in accordance with the descriptor; and
   flag writing means for writing, into the primary memory of the primary bus, a flag indicating completion of the write of the status read out by said status reading means.

2. A PCI bridge which connects between a primary bus and a secondary bus, comprising:
   a PCI-to-PCI bridge for transferring a transaction between the primary bus and the secondary bus;
   a DMA accelerator;
   an arbiter for allowing an output of a transaction to the primary bus when the transaction is generated at said PCI-to-PCI bridge or said DMA accelerator; and a configuration register for storing information including a device identifier, which is common to said PCI-to-PCI bridge and said DMA accelerator, to cause said PCI-to-PCI bridge and said DMA accelerator to operate as one device on a PCI bus, wherein said DMA accelerator reads out a descriptor from a first memory on the primary bus, reads out a status from a second memory on the secondary bus, writes the status into the first memory on the primary bus at a write address designated by the descriptor, and writes, into the descriptor in the first memory, a flag indicating an end of a status transfer.

3. The PCI bridge according to claim 2, further comprising an arbiter for controlling output from said PCI-to-PCI bridge and said DMA accelerator to the primary bus.

* * * * *